United States Patent
Gupta et al.

(10) Patent No.: US 11,171,991 B2
(45) Date of Patent: Nov. 9, 2021

(54) AUTOMATICALLY ASSIGNING LABELS TO WORKLOADS WHILE MAINTAINING SECURITY BOUNDARIES

(71) Applicant: Illumio, Inc., Sunnyvale, CA (US)

(72) Inventors: Mukesh Gupta, Fremont, CA (US); Juraj George Fandli, Campbell, CA (US)

(73) Assignee: Illumio, Inc., Sunnyvale, CA (US)

( * ) Notice: Subject to any disclaimer, the term of this patent is extended or adjusted under 35 U.S.C. 154(b) by 344 days.

(21) Appl. No.: 16/289,125

(22) Filed: Feb. 28, 2019

(65) Prior Publication Data
US 2020/0280586 A1 Sep. 3, 2020

(51) Int. Cl.
*H04L 29/06* (2006.01)
*H04L 9/32* (2006.01)
*H04L 9/08* (2006.01)

(52) U.S. Cl.
CPC ............ *H04L 63/20* (2013.01); *H04L 9/0819* (2013.01); *H04L 9/32* (2013.01)

(58) Field of Classification Search
CPC ......... H04L 63/20; H04L 9/32; H04L 9/0819; H04L 63/18; H04L 63/062; H04L 63/0263; H04L 9/088
See application file for complete search history.

(56) References Cited

U.S. PATENT DOCUMENTS

| | | | |
|---|---|---|---|
| 2007/0136603 A1* | 6/2007 | Kuecuekyan | H04L 63/0884 713/185 |
| 2012/0036552 A1* | 2/2012 | Dare | H04L 41/0803 726/1 |
| 2012/0131354 A1* | 5/2012 | French | H04L 9/3271 713/189 |
| 2012/0204224 A1* | 8/2012 | Wang | H04W 4/08 726/3 |
| 2012/0266209 A1* | 10/2012 | Gooding | H04L 63/20 726/1 |
| 2015/0127832 A1* | 5/2015 | Kirner | H04L 63/06 709/225 |
| 2015/0188949 A1* | 7/2015 | Mahaffey | H04W 12/37 726/1 |

* cited by examiner

*Primary Examiner* — Cheng-Feng Huang
(74) *Attorney, Agent, or Firm* — Fenwick & West LLP

(57) ABSTRACT

In a segmented network environment, a segmentation server assigns labels to workloads to enable the segmentation server to implement a segmentation policy based on label-based rules. A first set of labels associated with one or more label dimensions may be assigned in a secure manner by automatically assigning the labels based on a pairing profile. A second set of labels associated with different label dimensions may be assigned automatically based on workload attributes. An administrator can manage which label dimensions are assigned in a secure way based on the pairing profile and which labels are assigned in an adaptable way based on workload attributes, thereby enabling the administrator to flexibly manage the tradeoff between adaptability and security.

18 Claims, 4 Drawing Sheets

AUTOMATICALLY ASSIGNING LABELS TO WORKLOADS WHILE MAINTAINING SECURITY BOUNDARIES

BACKGROUND

Technical Field

This application relates to managing a segmentation policy that controls communications between workloads.

Description of Related Art

A segmentation policy comprises a set of rules that control which workloads may communicate on a network and may place restrictions on how such workloads may communicate. To enable an administrator to manage the segmentation policy at a high level of abstraction, labels are assigned to workloads and the rules are specified in terms of the labels. Thus, for example, a rule may indicate that a first group of workloads having a first label set are permitted to communicate with a second group of workloads having a second label set. In order to efficiently assign labels to workloads, a set of rules may be executed to automatically assign labels to workloads based on attributes of the workloads. However, a bad actor with knowledge of the label assignment scheme and the segmentation policy may be able to manipulate workload attributes to cause certain labels to be assigned to a workload. By controlling label assignments in a malicious way, the bad actor may be able to gain access to other workloads, thereby creating a security risk.

SUMMARY

A system, non-transitory computer-readable storage medium, and method assigns labels to workloads for enforcing a segmentation policy. A pairing request is received from a workload that includes a pairing key associated with a pairing profile. A first label associated with a first label dimension is assigned to the workload based on the pairing profile. One or more attributes of a workload is received. A set of labeling rules are applied to assign a second label associated with a second label dimension to the workload based on the one or more attributes. Based on a segmentation policy, one or more label-based segmentation rules applicable to the workload are identified based on the first and second labels assigned to the workload. The one or more label-based segmentation rules are distributed to the workload to enable the workload to enforce the segmentation policy.

In an embodiment, a scope of the labeling rules is obtained that specifies a set of label dimensions. The segmentation server determines that the workload has the set of label dimensions specified by the scope and applies the set of labeling rules responsive to the determination.

In an embodiment, the second label dimension assigned by the labeling rules is different than the first label dimension assigned based on the pairing profile. Thus, the first label associated with the first label dimension assigned based on the pairing profile is secured and does not change based on the labeling rules.

In an embodiment, assigning the labels based on the pairing profile includes authenticating the pairing key received from the workload, and assigning the first label responsive to the pairing key being valid such that labels are assigned in a secure manner.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

In a segmented network environment, a segmentation server assigns labels to workloads to enable the segmentation server to implement a segmentation policy based on label-based rules. A first set of labels associated with one or more label dimensions may be assigned in a secure manner by automatically assigning the labels based on a pairing profile that is dependent on authentication of a pairing key received from a host associated with the workload. These labels cannot be changed based on actions on the host, thereby creating security boundaries around these labels. A second set of labels associated with different label dimensions may be assigned automatically based on workload attributes. These labels are adaptable to changing conditions of the workloads, thereby enabling flexibility and efficiency in managing the segmentation policy. An administrator has flexibility to determine which label dimensions are assigned in a secure way based on the pairing profile and which labels are assigned in an adaptable way based on workload attributes, thereby enabling the administrator to flexibly manage the tradeoff between adaptability and security.

Figure 1:
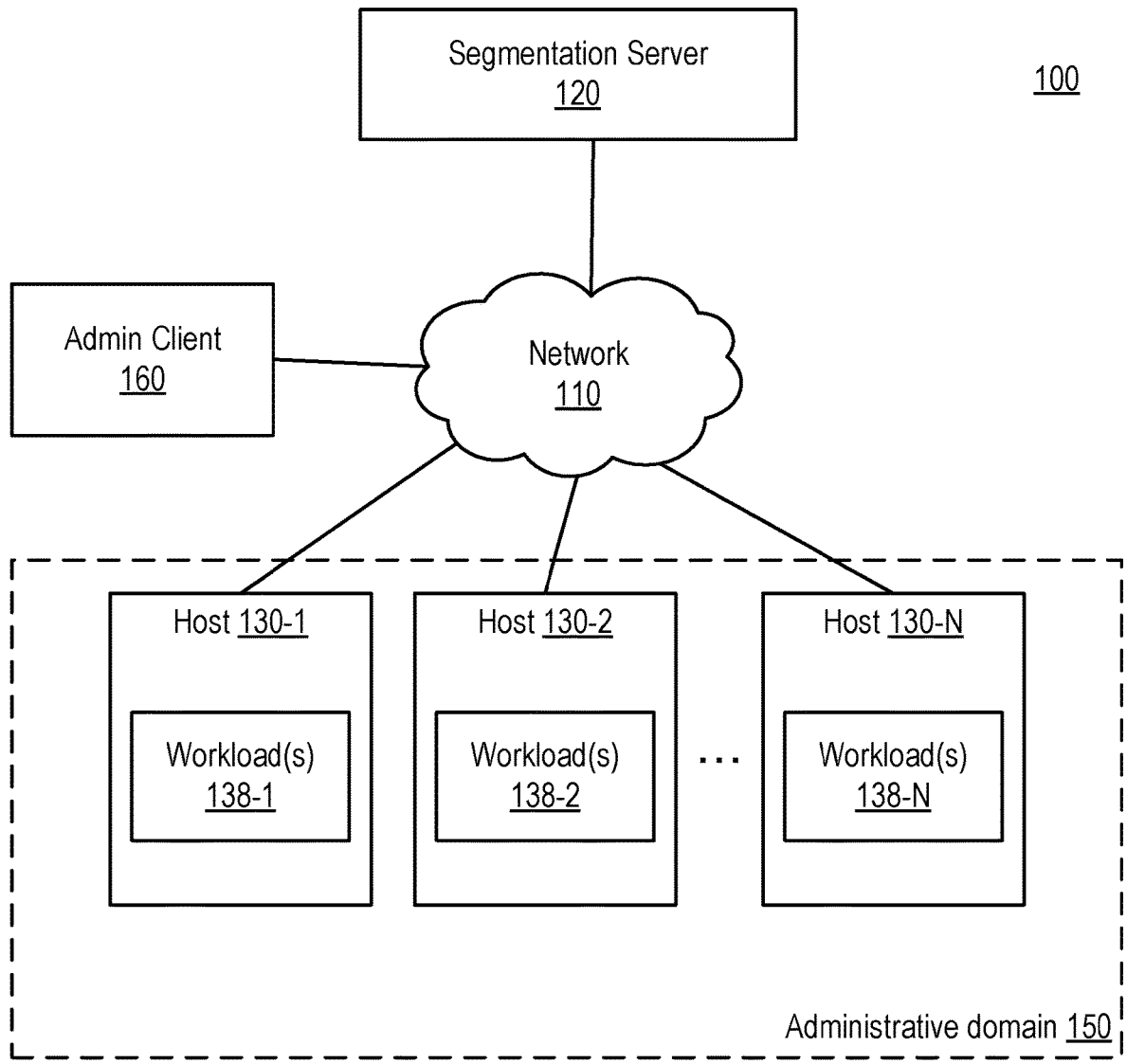
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of hosts 130 (e.g., hosts 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the hosts 130. In one embodiment, the network 110 uses standard communications technologies and/or protocols and can include the Internet. In another embodiment, the entities on the network 110 can use custom and/or dedicated data communications technologies.

The hosts 130 may comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the host 130. In some instances, a host 130 may operate only a single workload 138. In other instances, a host 130 may operate multiple workloads 138 that may be independently addressable and may perform different independent computing functions. The workloads 138 on the hosts 130 may communicate with other workloads 138 on different hosts 130 within the administrative domain 150 to perform various tasks.

The segmentation server 120 is a computer (or set of computers) that obtains and stores information about the hosts 130 on the network 120 and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an host 130-1 is allowed to provide a particular service to a workload 138-2 operating on an host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, each workload 138 may belong to one or more workload groups. The workload groups may each be associated with a set of common labels assigned to the workloads in the group. The labels assigned to each workload 138 define one or more high-level characteristics of the workload 138. Particularly, a label may comprise a "dimension" (a category of high-level characteristics) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe."

Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store, for each host 130, workload identifiers for workloads 138 associated with the OS instance 138 and membership information indicating one or more groups of workloads 138 to which each workload 138 belong (e.g., as defined by the respective label sets for the workloads 138).

Table 2 illustrates an example of information stored by the segmentation server 120. The workload ID(s) represent the workload identifier for the workload(s) 138 executing on each host 130. The workload identifier may comprise, for example, an IP address or other identifier that uniquely identifies the workload 138. The memberships represent groups to which one or more workloads 138 executing on the host 130 belongs. Each group may correspond to a unique label set involving one or more dimensions.

TABLE 2

Example of a Repository Table

| Workload ID(s) | Memberships |
|---|---|
| ID1 | A, C, D |
| ID2 | B, C |
| ID3 | D |
| . | . |
| . | . |
| . | . |
| IDn | B, D, E, F |

Instead of enforcing the segmentation policy at a centralized device, the segmentation policy is instead enforced by at least a subset of the hosts 130. To enable enforcement of the segmentation policy, the segmentation server 120 generates a set of management instructions and distributes the management instructions to the hosts 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different hosts 130 so that each host 130 gets only the management instructions relevant to its operation. Here, the segmentation server 120 may determine which rules are relevant to a given host 130 and distribute the relevant rules to that host 130. A rule may be deemed relevant to a particular host 130 if that host 130 executes one or more workloads 138 that belongs to a group (defined by one or more label sets) referenced by the rule. The segmentation server 120 may furthermore determine which membership information is relevant to each host 130 and distribute the relevant membership information to each respective host 130. Here, membership information may be relevant to a particular host 130 if it defines membership of a group referenced by a rule deemed relevant to the particular host 130. Beneficially, the relevant rules and relevant membership information may be sent to the hosts 130 separately from each other. Independently sending relevant rules and relevant membership information may improve the efficiency of updates when the segmentation policy changes or when workloads are added or removed from the network 110. For example, in response to a change in the segmentation policy, the segmentation server 120 may send updated rules to the affected hosts 130 but need not re-send the membership information absent any changes. Similarly, in response to a change in membership information (e.g., a new workload being added to the network or being re-assigned to a new label set), the segmentation server 120 may send updated membership information to the affected hosts 130 without necessarily re-sending the rules.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the hosts 130 and workloads 138 on the network 120 and view traffic flows between the workloads 138.

Figure 2:
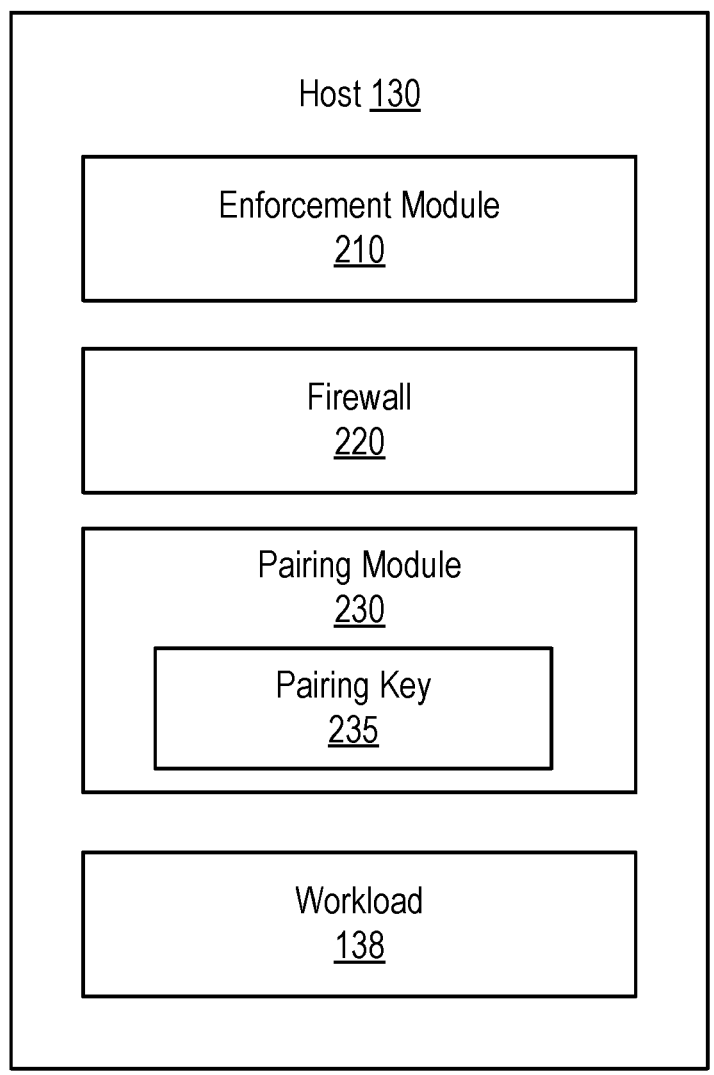
FIG. 2 is a block diagram illustrating an example embodiment of a host.

FIG. 2 illustrates an example embodiment of a host 130. The host 130 comprises an enforcement module 210, a firewall 220, a pairing profile 230, and one or more workloads 138. The enforcement module 210 receives the management instructions including the relevant rules and the relevant membership information from the segmentation server 120 and translates the management instructions from a high level of abstraction to a low level of abstraction to configure the firewall 220. For example, for a given rule that permits communication between a workload 138 executing on the host 130 and a group of other workloads 138 having a particular label set, the enforcement module 210 determines from the relevant membership information, workload identifiers for each of the workloads 138 having the particular label set, and configures firewall rules of the firewall 220 to permit communications with the identified workloads 138 in accordance with any restrictions (e.g., ports and protocols) specified in the given rule.

The firewall 220 operates to execute firewall rules that enforce the segmentation policy with respect to a workload 138 executing on the host 130. In an embodiment, the firewall rules executed on the firewall 220 are generally permissive rules that specify which specific communications are permitted by the segmentation firewall. However, the firewall rules may furthermore include a default rule that causes the firewall 220 to block communications (e.g., drop packets) that do not match any of the permissive rules.

The pairing module 230 provides the pairing key 235 to the segmentation server 120 to enable the workload 138 to pair with the segmentation server 120. In an embodiment, the pairing key 235 comprises a cryptographic identifier that may uniquely identifies a pairing profile associated with the workload 138. Here, the pairing profile designates a label set and/or other configured characteristics of the workload 138. The pairing profile may designate a label value for at least one label dimension but does not necessarily designate label values for all label dimensions. The host 130 may obtain the pairing key 235 from the segmentation server 120 through an out-of-band communication or may be installed on the host 130 manually by an administrator. For example, in an embodiment, the pairing key 235 may be sent to an email address of an administrator of the workload 138 with instructions to enable the administrator to install the pairing key on the host 130. The pairing module 230 sends the pairing key 235 to the segmentation server 120 in a pairing process when the workload 138 comes online or when a state of the workload 138 changes to enable the segmentation server 120 to identify the label set to be assigned to the workload 138 and authenticate the validity of the pairing key 235. If authenticated, the host 130 can obtain the management instructions from the segmentation server 120 to enable it to enforce the segmentation policy.

In an embodiment, the pairing module 230 may furthermore request specific labels for the workload 138. For example, the pairing module 230 may request a particular label that may differ from a default label associated with the pairing key 235. Alternatively, the pairing key 235 may be associated with labels in a limited number of dimensions, and the pairing module 230 may request a particular label in a dimension different than those set based on the pairing key 235. For example, in an embodiment, a user of the workload 138 may adjust configuration settings to request particular labels. Depending on a pairing profile associated with the pairing key 235, the segmentation server 120 may determine to allow or deny the requested labels as will be described in further detail below.

Figure 3:
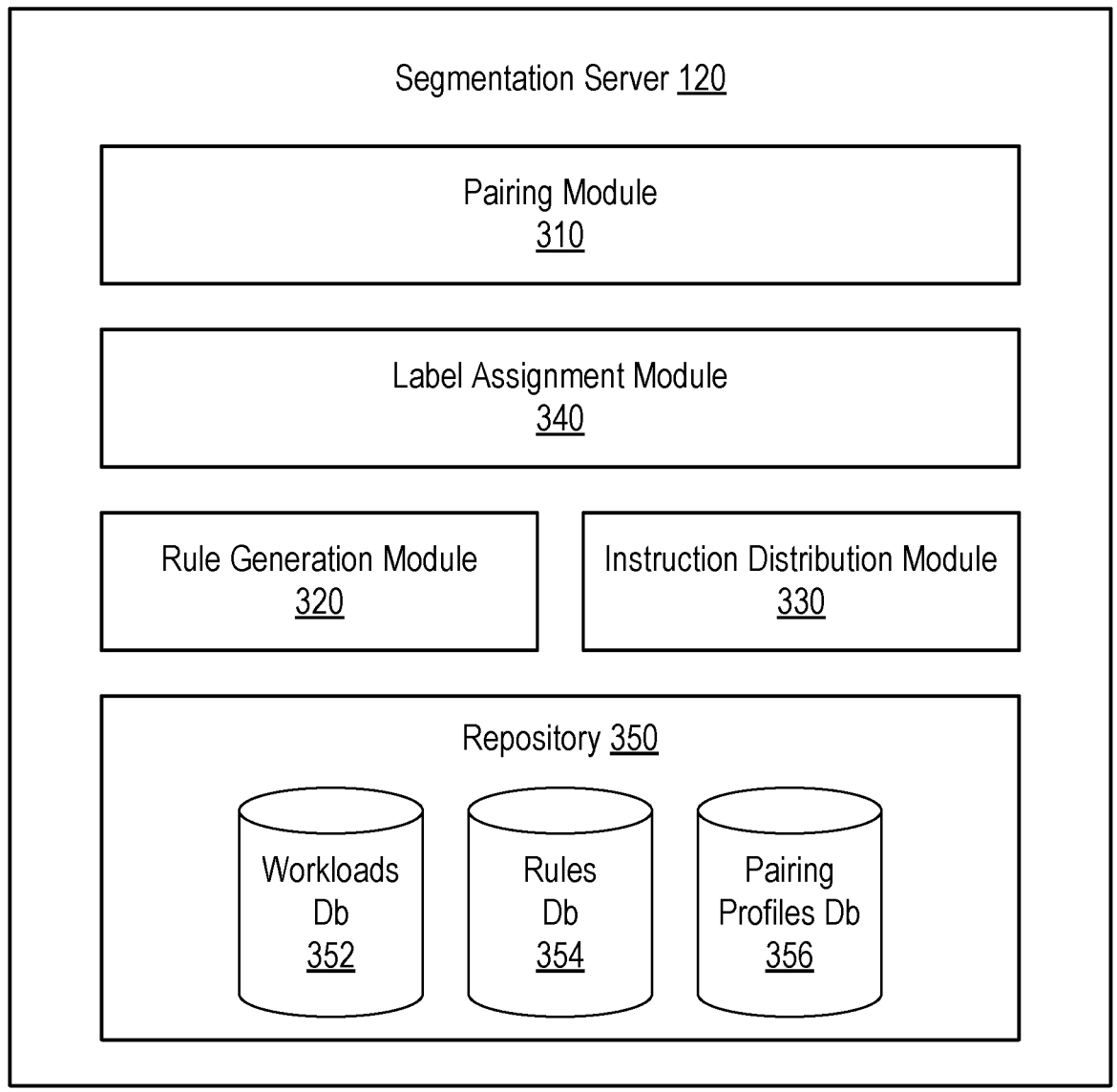
FIG. 3 is a block diagram illustrating example an embodiment of a segmentation server.

FIG. 3 is a high-level block diagram of an embodiment of a segmentation server 120. The segmentation server 120 comprises a pairing module 310, a label assignment module 340, a rule generation module 320, an instruction distribution module 330, and a repository 350. The repository 350 may comprise a workloads database 352 that stores associations between workloads 138 and their respective label sets, a rules database 354 that stores a segmentation policy as a set of rules, and a pairing profiles database 356 that stores pairing profiles for workloads 138. Here, a pairing profile may include, for example, a pairing key, labels, and/or other configuration information for pairing a workload 138 to the segmentation server 120. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The rule generation module 320 automatically generates or updates a segmentation policy comprising a set of rules. The rules may be manually configured by a system administrator or may be generated automatically based on various predefined segmentation strategies.

The pairing module 310 controls pairing of the workloads 138 with the segmentation server 120. The pairing module 310 may generate a pairing key 235 and store the pairing key 235 with a particular pairing profile in the pairing profile database 356. The pairing module 310 may generate the pairing key 235 based on a cryptographic identifier. In an embodiment, a unique pairing key 235 is stored for each pairing profile corresponding to a unique label set. Thus, for example, a set of workloads 138 sharing the same label set may pair using the same pairing key 235 but different keys may be required for workloads 138 having different label sets. A pairing key 235 may be associated with a label set in only a subset of label dimensions that does not necessarily include all of the label dimensions. The pairing module 310 may furthermore store various metadata associated with the pairing key 235 such as, for example, a maximum number of key usages, a key lifespan time period, and a revocation status. Here, a pairing key 235 is valid if it has not exceeded its maximum number of key usages, has a lifetime within the lifespan time period, and is not revoked.

Pairing keys 235 may be distributed to hosts 130 using an out-of-band communication. For example, the pairing key 235 may be sent to an administrator of the host 130 (e.g., via email or text message accessible by the admin client 160) together with instructions for storing the pairing key 235 to the host 130. In this manner, access to the pairing keys 235 is controlled by the administrator and only workloads 138 managed by trusted hosts 130 having the appropriate pairing keys 235 are able to pair with the segmentation server 120.

Upon receiving a pairing request, the pairing module 310 determines if the pairing key 235 is valid. For example, the pairing module 310 determines that the pairing key 235 is not expired or revoked and matches a pairing key 235 in one of the pairing profiles stored in the pairing profiles database 356. If the pairing module 310 validates the pairing key 235, the pairing module 310 determines a label set to assign to the workload 138 based on the pairing profile matching the pairing key and/or based on requested labels received with the pairing request. Here, labels associated with the stored pairing profile may be locked or unlocked. If labels associated with the pairing profile are unlocked and the pairing module 310 receives requested labels together with the pairing request, then the pairing module 310 assigns the requested labels to the requesting workload 138. On the other hand, if the labels associated with the pairing profile are locked, then the pairing module 310 assigns the locked labels regardless of the requested labels. In an embodiment, labels associated with some dimensions may be locked while labels associated with other dimensions may be unlocked. For example, a particular pairing profile may lock the "environment" label to "production" but may have an unlocked "role" label to enable the workload 138 to request a particular role label. Furthermore, in an embodiment, the pairing module 310 may optionally deny the pairing request if the requested labels do not match locked labels associated with the pairing profile. Upon validating the pairing key, the segmentation server 120 stores an identifier for the newly paired workload 138 to the workloads database 352 in association with its corresponding label set.

After pairing a new workload 138 with the segmentation server 120, the instruction distribution module 330 generates the management instructions from the rules for a current segmentation policy and distributes the relevant management instructions to the host 130 associated with the newly paired workload 138. Furthermore, the instruction distribution module 330 may update management instructions for other hosts 130 that are affected by the newly paired workload 138 (e.g., to permit communication with the newly paired workload 138 in accordance with the rules).

If the pairing key is invalid, then the pairing module 310 does not add the requesting workload 138 to the workload database 352. As a result, the requesting workload 138 does not gain membership to any groups that other workloads 138 are permitted to communicate with and the unpaired workload 138 thus remains isolated, thereby maintaining security of the administrative domain 150. The segmentation server 130 may furthermore send a denial message to the requesting host 130 indicating the denial of the pairing request.

The label assignment module 340 may assign labels to workloads 138 that are not assigned in a fixed way by the pairing profile. The label assignment module 340 may assign labels based on a set of configurable rules that may be managed by an administrator via the administrative client 160. In an embodiment, an administrator interface only enables the administrator to configure label assignment rules that do not conflict with labels assigned by the pairing profiles as described above. The label assignment module 340 obtains workload attributes associated with workloads 138 and applies the label assignment rules to assign labels to workloads 138 based on their attributes. Workload attributes may include, for example, a hostname of a workload 138 (or portion thereof), an IP address or other identifier of a workload 138, a running process executing on the workload 138, open ports on the workload 138, or other detectable characteristics of the workload 138. The label assignment rules may be specified as a set of conditional statements that assign one or more particular labels in response to a specified condition being true. For example, a label assignment rule may specify that if a hostname of a workload contains the characters, "prod", then assign the label value "PROD" to the "Environment" label dimension. In another example, a label assignment rule may specify that if the IP address is in the range 10.1.0.0/16, then assign the label value "Washington" to the "Location" label dimension. In yet another example, a label assignment rule may specify that if a running process on a workload 138 matches "MySQL.exe", then assign the label value "Database" to the "Role" label dimension.

The label assignment module 340 may also enable a scope to be configured in association with a set of one or more label assignment rules. The scope constrains the set of workloads 138 to which the label assignment module 340 applies the one or more label assignment rules by specifying particular labels that may already be assigned (e.g., based on the pairing profiles). For example, a scope "Environment: PROD" may be associated with a label assignment rule that specifies that if the hostname contains "HRM," then set the label value "hrm" to the application label dimension. In this case, the label assignment rule identifies workloads 138 within the scope (i.e., workloads 138 that have the label value "PROD" in the environment label dimension) and then runs the rule only on those identified workloads 138 within the scope. Thus, no label assignments are made by the rule to workloads 138 outside the scope.

The label assignment module 340 applies the label assignment rules only to label dimensions that are not assigned by the pairing module 310. In this way, the pairing profiles of the pairing modules 310 can be used to set security boundaries such that certain labels become fixed and cannot be changed by the label assignment rules based on the workload attributes.

The label assignment rules and the pairing profiles may be customized by an administrator. Here, an administrator can determine a first subset of labels that are assigned by the pairing module 310 via the pairing profiles and a second subset of labels that are assigned by the label assignment module 340 via the label assignment rules. For example, an administrator may configure the segmentation server 120 to pair a set of workloads 138 using a pairing profile that forces the "Environment" label dimension to a value "PROD". The administrator may then configure the segmentation server 120 to assign values to the label dimension "Role" based on label assignment rules that depend on characteristics of the workloads 138.

The above described label assignment scheme beneficially enables an administrator to assign label values for certain label dimensions through the pairing module 310 while assigning label values for other label dimensions through the label assignment module 320. The label values assigned via the pairing module 310 depend only on the pairing key 235 provided by the workload 138 and are independent of the workload attributes used by the label assignment module 320. Thus, label values assigned via the pairing module 310 cannot be manipulated by changing the workload attributes. Labels assigned by the pairing module 310 are thus highly secure and generally cannot be manipulated by a bad actor. In contrast, label values assigned to label dimensions through the label assignment module 320 are affected by the workload attributes and thus enable certain label values to be obtained as workload attributes change. The label values in these label dimensions are thus highly flexible and allow the labels to adapt to changing attributes of the workload 138. This may be desirable to avoid issuing a new pairing profile each time a host 130 is repurposed within an organization, moves to a different location, provides different services, etc. By enabling an administrator to specify which label dimensions are assigned via the pairing profile and which label dimension are assigned by the label assignment rules, the administrator is provided flexibility in managing the tradeoff between security and adaptability. For example, an administrator may desire a configuration in which the label value for the environment dimension is assigned by the pairing profile and does not change based on workload attributes, while label values for the role and location dimensions are assigned based on the label rules and can adapt automatically based on the host 130 changing workload attributes. For example, the administrator may configure the label assignment rules to assign the location label based on the IP address of the workload 138 (which may change as the host 130 moves to a different physical location) and assign the role label based on the hostname (which may be updated when the workload 138 changes role).

Figure 4:
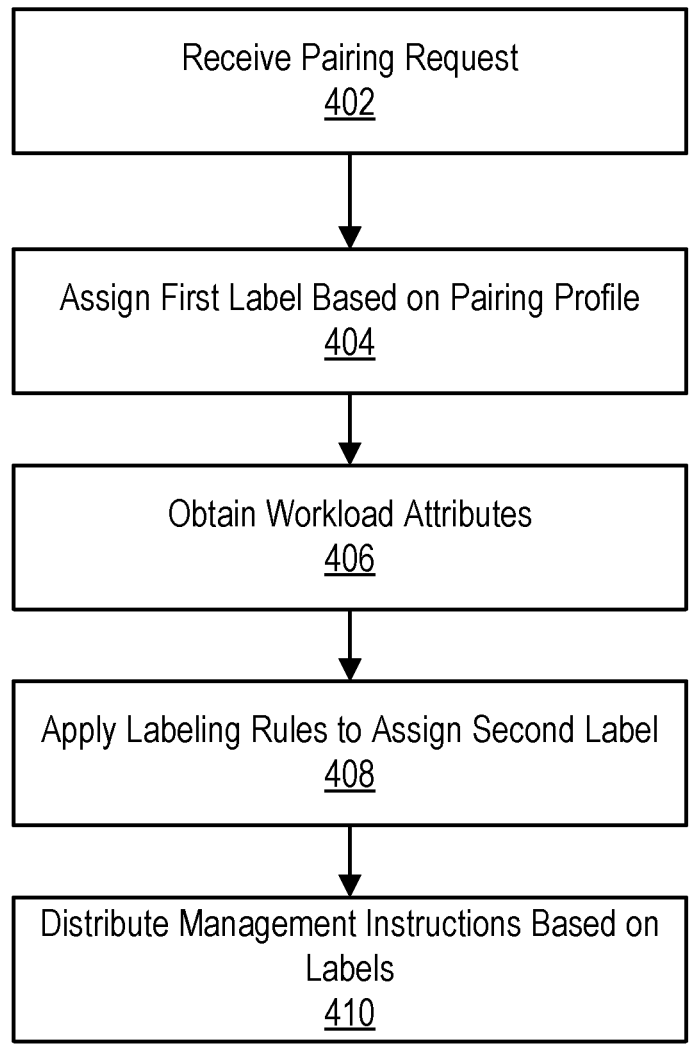
FIG. 4 is a block diagram illustrating an example embodiment of a process for assigning labels to workloads.

FIG. 4 illustrates an example embodiment of a process for assigning labels to workloads 138. The segmentation server 120 receives 402 a pairing request including a pairing key 235 associated with a workload 138. The segmentation server 120 assigns 404 at least a first label in a first label dimension to the workload 138 based on the pairing request. For example, the segmentation server 120 identifies a pairing profile associated with the pairing key 235 and assigns at least a first label based on the pairing profile. The labels assigned based on the pairing profile are secured labels that cannot be changed based on the workload attributes and can only be modified with a different pairing key 235 associated with different labels. The segmentation server 120 obtains 406 workload attributes associated with the workload 138. The segmentation server 120 applies 408 the labeling rules to assign at least a second label in a second label dimension based on the workload attributes. In contrast to the pairing-based label assignments, the labels assigned based on the workload attributes can be changed based on changes to workload attributes and are thus adaptable to different conditions of the workload 138. The management instructions associated with the segmentation policy are then distributed 410 to workloads 138 based on the labels. Beneficially, an administrator can configure which label dimensions are made secure by being tied to the pairing profile and which label dimensions are made adaptable by being associated with the workload attributes. As a result, the segmentation policy can be implemented efficiently with an adaptable labeling scheme while still maintaining desired security boundaries.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for assigning labels to workloads for enforcing a segmentation policy, the method comprising:
   obtaining a label assignment configuration that specifies at least a first label dimension of a multi-dimensional label set to be securely assigned to workloads based on a pairing mechanism and at least a second label dimension of the multi-dimensional label set to be adaptably assigned based on detected workload attributes;
   receiving a pairing request from a workload, the pairing request including a pairing key associated with a pairing profile;
   assigning a first label associated with the first label dimension to the workload based on the pairing profile
   receiving one or more attributes of the workload;
   automatically applying a set of labeling rules to assign a second label associated with the second label dimension to the workload based on the one or more attributes;
   determining, based on a segmentation policy, one or more label-based segmentation rules applicable to the workload based on the first and second labels assigned to the workload;
   distributing the one or more label-based segmentation rules to the workload to enable the workload to enforce the segmentation policy;
   detecting a change to the one or more attributes of the workload;
   automatically updating the second label associated with the second label dimension based on the labeling rules responsive to detecting the change to the one or more attributes, wherein the first label associated with the first label dimension assigned based on the pairing profile is secured and does not change based on the labeling rules responsive to detecting the change to the one or more attributes;
   determining, based on the segmentation policy, one or more updated label-based segmentation rules applicable to the workload based on the first label and the updated second label assigned to the workload; and
   distributing the one or more updated label-based segmentation rules to the workload to enable the workload to enforce the segmentation policy.

2. The method of claim 1, wherein applying the set of labeling rules comprises:
   receiving a scope of the labeling rules specifying a set of label dimensions;
   determining that the workload has the set of label dimensions specified by the scope; and
   applying the set of labeling rules to the workload responsive to determining that the workload has the set of label dimensions specified by the scope of the labeling rule.

3. The method of claim 2, wherein the second label dimension assigned by the labeling rules is different than the first label dimension assigned based on the pairing profile.

4. The method of claim 1, wherein assigning the first label associated with the first label dimension comprises:
   authenticating the pairing key received from the workload; and
   assigning the first label responsive to the pairing key being valid.

5. The method of claim 1, wherein the one or more attributes comprises at least one of: a portion of a hostname of the workload, an IP address of the workload, a running process executing on the workload, and an open port on the workload.

6. The method of claim 1, wherein determining the one or more label-based segmentation rules applicable to the workload comprises identifying that the one or more label-based segmentation rules applicable to the workload reference the first label and the second label.

7. A non-transitory computer-readable storage medium storing instructions for assigning labels to workloads, the instructions when executed by a processor causing the processor to perform steps including:
   obtaining a label assignment configuration that specifies at least a first label dimension of a multi-dimensional label set to be securely assigned to workloads based on a pairing mechanism and at least a second label dimension of the multi-dimensional label set to be adaptably assigned based on detected workload attributes;
   receiving a pairing request from a workload, the pairing request including a pairing key associated with a pairing profile;
   assigning a first label associated with the first label dimension to the workload based on the pairing profile;
   receiving one or more attributes of the workload;
   automatically applying a set of labeling rules to assign a second label associated with the second label dimension to the workload based on the one or more attributes;
   determining, based on a segmentation policy, one or more label-based segmentation rules applicable to the workload based on the first and second labels assigned to the workload;
   distributing the one or more label-based segmentation rules to the workload to enable the workload to enforce the segmentation policy;
   detecting a change to the one or more attributes of the workload;
   automatically updating the second label associated with the second label dimension based on the labeling rules responsive to detecting the change to the one or more attributes, wherein the first label associated with the first label dimension assigned based on the pairing profile is secured and does not change based on the labeling rules responsive to detecting the change to the one or more attributes;

determining, based on the segmentation policy, one or more updated label-based segmentation rules applicable to the workload based on the first label and the updated second label assigned to the workload; and distributing the one or more updated label-based segmentation rules to the workload to enable the workload to enforce the segmentation policy.

8. The non-transitory computer-readable storage medium of claim 7, wherein applying the set of labeling rules comprises:

receiving a scope of the labeling rules specifying a set of label dimensions;

determining that the workload has the set of label dimensions specified by the scope; and applying the set of labeling rules to the workload responsive to determining that the workload has the set of label dimensions specified by the scope of the labeling rule.

9. The non-transitory computer-readable storage medium of claim 8, wherein the second label dimension assigned by the labeling rules is different than the first label dimension assigned based on the pairing profile.

10. The non-transitory computer-readable storage medium of claim 8, wherein assigning the first label associated with the first label dimension comprises:

authenticating the pairing key received from the workload; and assigning the first label responsive to the pairing key being valid.

11. The non-transitory computer-readable storage medium of claim 8, wherein the one or more attributes comprises at least one of: a portion of a hostname of the workload, an IP address of the workload, a running process executing on the workload, and an open port on the workload.

12. The non-transitory computer-readable storage medium of claim 8, wherein determining the one or more label-based segmentation rules applicable to the workload comprises identifying that the one or more label-based segmentation rules applicable to the workload reference the first label and the second label.

13. A computer system comprising:
a processor; and
a non-transitory computer-readable storage medium storing instructions for enforcing a segmentation policy, the instructions when executed by a processor causing the processor to perform steps including:

obtaining a label assignment configuration that specifies at least a first label dimension of a multi-dimensional label set to be securely assigned to workloads based on a pairing mechanism and at least a second label dimension of the multi-dimensional label set to be adaptably assigned based on detected workload attributes;

receiving a pairing request from a workload, the pairing request including a pairing key associated with a pairing profile;

assigning a first label associated with the first label dimension to the workload based on the pairing profile;

receiving one or more attributes of the workload;

automatically applying a set of labeling rules to assign a second label associated with the second label dimension to the workload based on the one or more attributes;

determining, based on a segmentation policy, one or more label-based segmentation rules applicable to the workload based on the first and second labels assigned to the workload;

distributing the one or more label-based segmentation rules to the workload to enable the workload to enforce the segmentation policy;

detecting a change to the one or more attributes of the workload;

automatically updating the second label associated with the second label dimension based on the labeling rules responsive to detecting the change to the one or more attributes, wherein the first label associated with the first label dimension assigned based on the pairing profile is secured and does not change based on the labeling rules responsive to detecting the change to the one or more attributes;

determining, based on the segmentation policy, one or more updated label-based segmentation rules applicable to the workload based on the first label and the updated second label assigned to the workload; and distributing the one or more updated label-based segmentation rules to the workload to enable the workload to enforce the segmentation policy.

14. The computer system of claim 13, wherein applying the set of labeling rules comprises:

receiving a scope of the labeling rules specifying a set of label dimensions;

determining that the workload has the set of label dimensions specified by the scope; and applying the set of labeling rules to the workload responsive to determining that the workload has the set of label dimensions specified by the scope of the labeling rule.

15. The computer system of claim 14, wherein the second label dimension assigned by the labeling rules is different than the first label dimension assigned based on the pairing profile.

16. The computer system of claim 13, wherein assigning the first label associated with the first label dimension comprises:

authenticating the pairing key received from the workload; and assigning the first label responsive to the pairing key being valid.

17. The computer system of claim 13, wherein the one or more attributes comprises at least one of: a portion of a hostname of the workload, an IP address of the workload, a running process executing on the workload, and an open port on the workload.

18. The computer system of claim 13, wherein determining the one or more label-based segmentation rules applicable to the workload comprises identifying that the one or more label-based segmentation rules applicable to the workload reference the first label and the second label.

* * * * *